United States Patent
Keith et al.

(10) Patent No.: US 6,206,331 B1
(45) Date of Patent: Mar. 27, 2001

(54) D-SHAPED WIRE HARNESS CLIP WITH RATCHET LOCK

(75) Inventors: Brett Allen Keith, Clarkston; Michael C. Niezur, Madison Heights, both of MI (US)

(73) Assignee: EWD, L.L.C., El Paso, TX (US)

( * ) Notice: Subject to any disclaimer, the term of this patent is extended or adjusted under 35 U.S.C. 154(b) by 0 days.

(21) Appl. No.: 09/447,965

(22) Filed: Nov. 23, 1999

Related U.S. Application Data

(63) Continuation of application No. 09/126,355, filed on Jul. 30, 1998, now abandoned.

(51) Int. Cl.[7] .................................................. F61L 3/08
(52) U.S. Cl. .................................... 248/74.1; 248/73
(58) Field of Search .............................. 248/74.1, 73, 71, 248/74.3, 74.2, 316.7, 68.1, 65, 69; 29/721; 24/16 PB

(56) References Cited

U.S. PATENT DOCUMENTS

| | | | |
|---|---|---|---|
| 4,386,752 | * 6/1983 | Pavlak et al. ........................ | 248/73 |
| 4,564,163 | * 1/1986 | Barnett ................................. | 248/71 |
| 4,840,345 | 6/1989 | Neil et al. . | |
| 4,871,134 | 10/1989 | Oikawa . | |
| 4,963,700 | 10/1990 | Olsen et al. . | |
| 5,024,405 | * 6/1991 | McGuire ............................... | 248/73 |
| 5,113,717 | * 5/1992 | Plamper ............................ | 74/502.6 |
| 5,344,112 | * 9/1994 | Peterson et al. .................... | 248/313 |
| 5,367,750 | 11/1994 | Ward . | |
| 5,615,851 | 4/1997 | LeBeau . | |
| 5,622,341 | * 4/1997 | Stana ................................. | 248/74.1 |
| 5,653,410 | 8/1997 | Stroeters et al. . | |
| 5,694,678 | 12/1997 | Karasik . | |
| 5,725,185 | * 3/1998 | Auclair ............................... | 248/74.2 |
| 5,820,048 | * 10/1998 | Shereyk et al. .................... | 248/68.1 |

* cited by examiner

Primary Examiner—Leslie A. Braun
Assistant Examiner—Tan Le
(74) Attorney, Agent, or Firm—Young & Basile, P.C.

(57) ABSTRACT

A wire harness clip for securing D-scrolled wire harness to a panel type mounting surface, for example in an automobile. A clip has an elongated mounting arm with an open-faced D-shape trough formed at one end and a panel-mounting clip such as a Christmas tree clip formed at an opposite end, on a common surface or side of the mounting arm. The trough includes a hinged cover adapted to releasably lock a D-scrolled wire harness into the trough, and in the illustrated embodiment is a generally flat cover spaced from the and generally parallel to the mounting arm in the closed position, and includes a curved ratcheting lock arm which is automatically guided into locking engagement with mating ratchet teeth on an outer surface of the trough for closing the cover in a blind mounting operation. The trough preferably includes a pair of tape positioning tabs extending generally perpendicular to the mounting arm in alignment with the wire harness for pre-mounting the wire harness to the trough by taping.

15 Claims, 2 Drawing Sheets

D-SHAPED WIRE HARNESS CLIP WITH RATCHET LOCK

RELATED APPLICATION DATA

This application is a continuation of U.S. Ser. No. 09/126,355 filed Jul. 30, 1998, now abandoned.

FIELD OF THE INVENTION

The present invention is in the field of wire harness clips used for securing wire harnesses to surfaces such as vehicle body panels.

BACKGROUND OF THE INVENTION

Wire harness clips are often used in the automotive industry for releasably securing wire harnesses to the interior surfaces of vehicle body panels as the harnesses are routed throughout the vehicle. Such known wire harness clips often include a Christmas tree type fastener adapted to be lockingly inserted into a hole in the vehicle panel, and a wire harness receiving portion provided with a ratchet-type lock adapted to clamp a portion of the wire harness in secure but releasable fashion. It is also known to secure a portion of the wire harness to the clip by means of taping provisions, usually in the form of rigid or semi-rigid tabs extending from the clip so that tape can be wrapped around the wire harness and the tab.

In certain vehicle wiring application it is desirable to form the wires in the harness into a D-shaped bundle, often using what is known in the art as D-shaped "scroll", comprising a thin-walled plastic sleeve having a D-shaped cross section adapted to fit over the wire harness. D-shaped scroll is particularly useful where it is desirable to have a flat wire harness surface against a flat vehicle panel surface. In some cases fasteners such as Christmas tree clips are formed directly on the scroll to eliminate the need for an intermediate wire harness clip, but such an arrangement makes it difficult to de-mount the wire harness.

SUMMARY OF THE INVENTION

The present invention is a wire harness clip specifically designed to mount D-shaped scroll type wire harnesses to vehicle body panels. The inventive wire harness clip generally comprises a D-shaped wire harness trough closed by a flat-surfaced cover. The wire harness clip also includes a panel-mounting portion provided with a mechanism for attaching it to a vehicle body panel, for example a standard Christmas tree clip. The Christmas tree clip or other structure for connecting the clip to the vehicle panel is located on the same side of the clip as the trough and cover.

In a preferred embodiment, the cover is hinged at an outer edge of the trough, with a downwardly extending lock finger which engages an inner side of the trough, and further includes an extension of the cover beyond the trough and lock arm. In a further preferred embodiment, the trough is provided with a tape positioning tab extending from either side, such that the overall shape of the wire harness clip is that of a "T". The D-shape of the trough prevents rotation of the scrolled wire harness; the locking cover prevents radial release of the wire harness; and the tape positioning tabs prevent motion of the wire harness longitudinally. Moreover, the releasable and reusable locking connection provided by the flat cover complements the disposable tape attachment of the wire harness to the tape positioning tabs in a manner which provides ease in initially positioning the clip on the wire harness, and then a positive mechanical connection between the clip and the harness.

The locking connection between the cover and trough is preferably self-guiding for blind assembly operations, using a guide member associated with the inner end of the trough These and other features and advantages of the invention will become apparent to those skilled in the art upon further reading of the written specification and reference to the accompanying drawings.

DETAILED DESCRIPTION OF THE ILLUSTRATED EMBODIMENT

Figure 1:
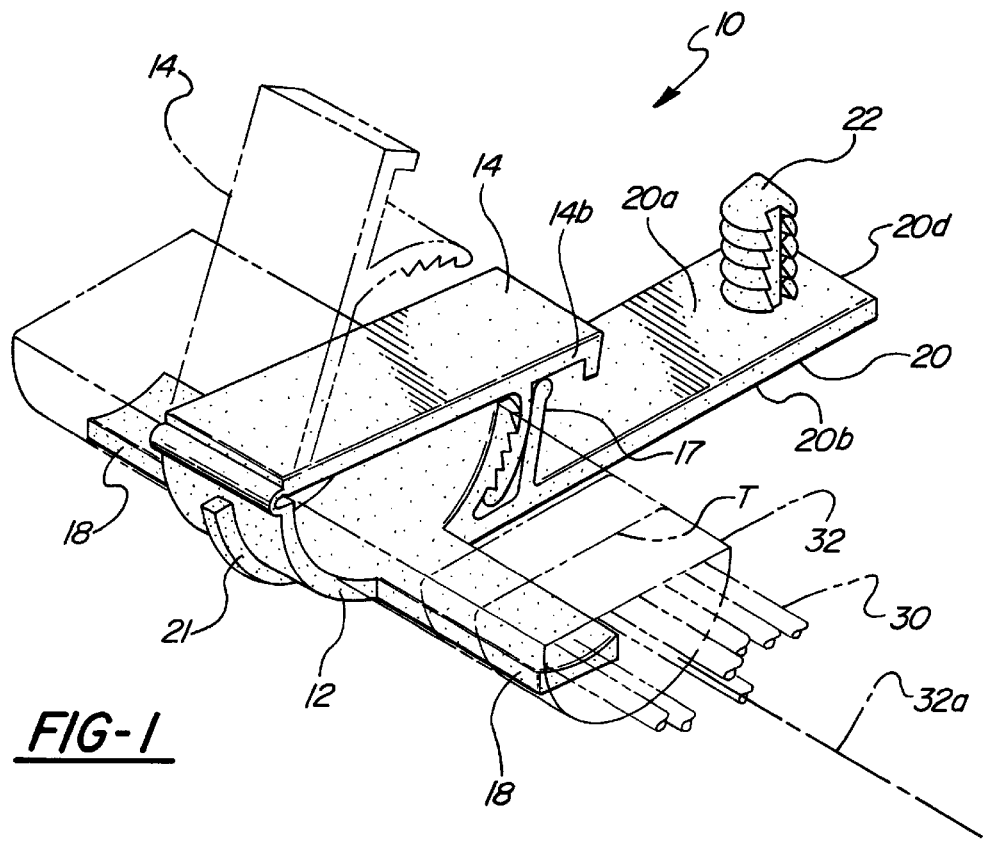
FIG. 1 is a perspective view of a wire harness clip according to the present invention, connected to a D-shaped wire harness and showing a ratchet-locking flat cover in an open position in phantom lines.
Figure 2:
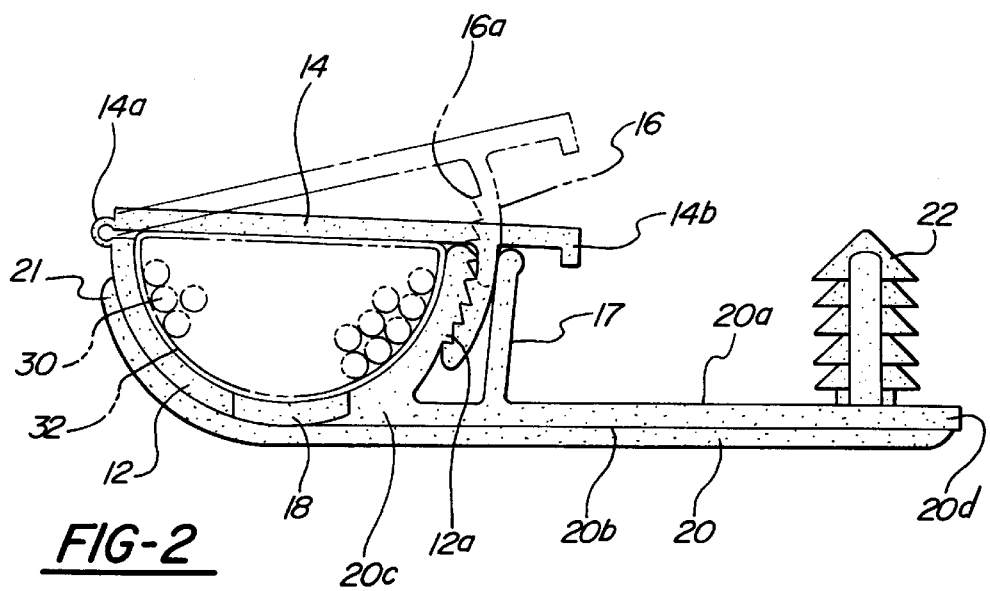
FIG. 2 is a side view of the wire harness clip of FIG. 1.

Referring first to FIGS. 1 and 2, an example of a preferred embodiment of the inventive wire harness clip is generally denoted by reference numeral 10. In the illustrated example, wire harness clip 10 is integrally molded from a single piece of plastic material, by way of non-limiting example a nylon or polypropylene known by those skilled in the art to be useful in the manufacture of wire harness clips.

Wire harness clip 10 is designed to secure a wire harness 30 with a generally "D"-shaped cross section by a surrounding piece of D-shaped scroll 32, which is a relatively thin-walled piece of plastic tubing known to those skilled in the art for bundling wire harnesses for certain applications.

Wire harness clip 10 generally takes the shape of a bi-planar rectangular part with a D-shaped trough defined by a semi-cylindrical, open-face body 12 enclosed by a flat cover 14. The trough is shaped to conformingly receive the D-scrolled wire harness 30, 32, the wire harness being radially and rotationally locked in trough 12 by cover 14 connected to an outer edge of the trough by a living hinge 14a. Flat cover 14 is releasably and reusably locked to the outer surface of an inner end of trough 12 by a downwardly-depending toothed ratchet arm or finger 16 whose teeth 16a mate with a set of teeth 12a on the trough portion. A resilient guide 17, illustrated as an upstanding finger or tab in FIGS. 1 and 2, is positioned adjacent teeth 12a on the trough for a yielding, sliding interference fit with the outside surface of the lock arm 16 as it engages the locking teeth 12a on the trough. In the illustrated embodiment, lock arm 16 shows a preferred curve corresponding to the curvature of trough 12 to provide a conforming, locking fit with the surface of the trough and, in the case of the ratchet-toothed locking structure example of the illustrated embodiment, maximize the locking surface area between the cover and the trough. The resilient nature of guide 17 maintains a constant pressure or bias on lock arm 16 as it initially engages the trough (phantom lines in FIG. 2) and continues downwardly to its fully closed, locked position (solid lines in FIG. 2).

FIGS. 1 and 2 also show a preferred form of flat cover 14 in which a finger-or tool-operable release tab 14b extends beyond resilient guide 17 to provide a convenient finger hold or prying point for opening cover 14 against the locking engagement of arm 16 and the trough.

Trough 12, cover 14 and locking structure 16, 17 are all formed on a first end 20d of the generally rectangular mounting arm 20, which supports panel-mounting structure such as a Christmas tree clip 22 at its second, opposite end 20c. While a Christmas tree type clip 22 is shown in the illustrated embodiment and is currently preferred, it will be apparent to those skilled in the art that other types of panel-mounting studs, clips and other known equivalents can be used.

While Christmas tree clip 22 is located on the first end 20d of mounting arm 20 opposite trough 12, it is preferably located on the upper side or surface 20a for a purpose described below. The lower side of the mounting arm is labeled with reference numeral 20b.

Still referring to FIGS. 1 and 2, trough 12 also preferably includes a pair of tape positioning tabs 18 extending from each side of the trough in longitudinal alignment with wire harness 30 and its axis 32a, such that wire harness clip 10 has a generally T-shape in plan view. Tape positioning tabs 18 are designed to engage portions of the wire harness 30 on each side of the trough, and in known fashion tape T can be wound around the outside of the wire harness and tabs 18 to initially position the wire harness on clip 10, and to longitudinally lock the wile harness and clip to one another. Tape positioning tabs 18 additionally provide a convenient place to secure wire harness 30 to clip 10 should hinged cover 14 somehow fail.

From the foregoing it will be clear that the inventive wire harness clip 10 can be used to securely mount a D-shaped wire harness 30 to a panel while limiting wire harness motion longitudinally, rotationally and radially relative to the trough.

Figure 3:
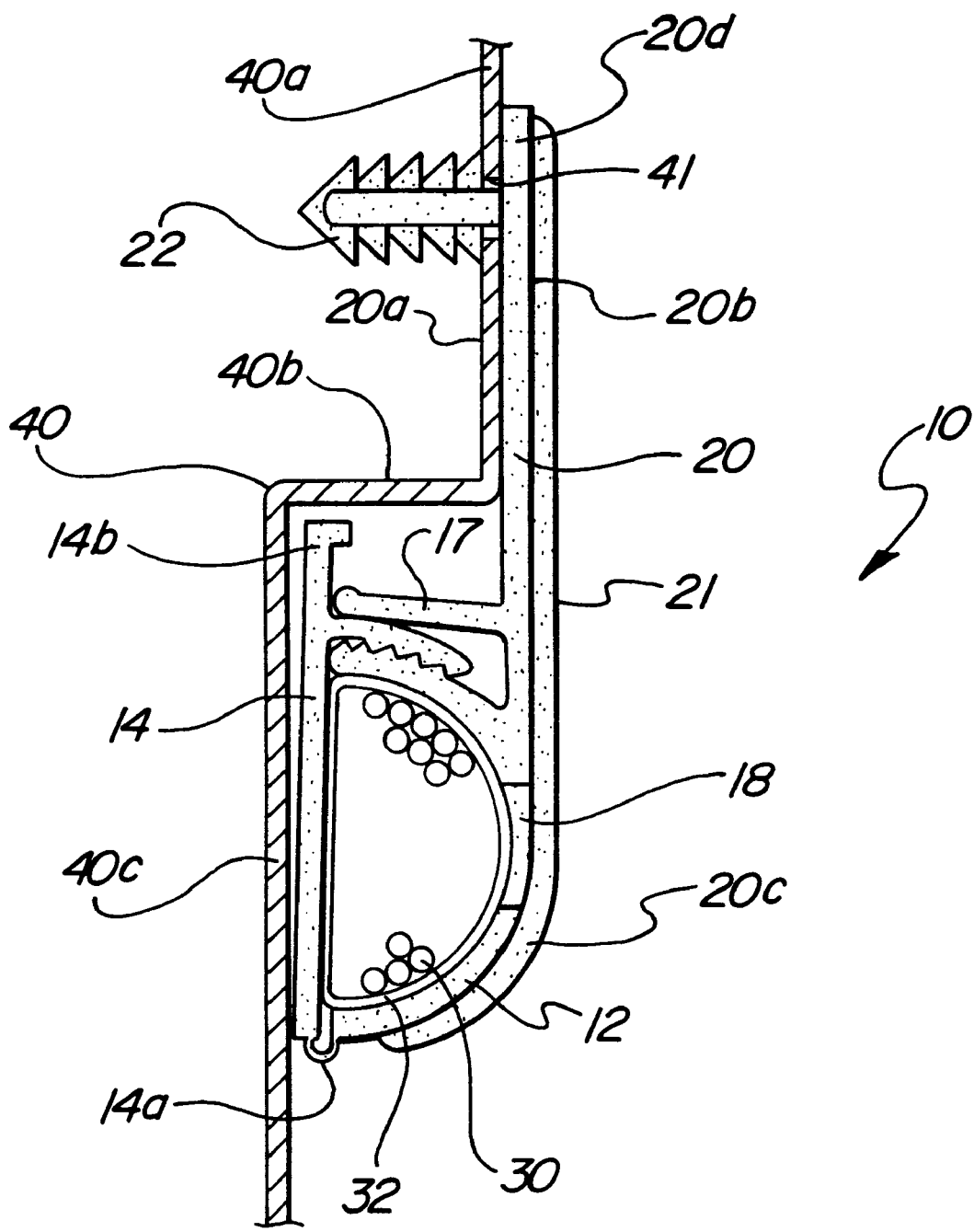
FIG. 3 shows the wire harness clip of FIG. 1 secured to a vehicle body panel having a stepped configuration.

FIG. 3 illustrates one possible and preferred mounting application for the wire harness clip 10 illustrated in FIGS. 1 and 2. A step-surfaced vehicle panel 40 is illustrated with a first mounting surface 40a, a recessed step 40b and a recessed surface 40c. Such stepped surfaces have in the past presented problems for mounting wire harnesses where it is desired to have the clip connection with the panel in a first plane (surface 40a), and to locate the wire harness in a different plane or recessed location (40c). While D-shaped scroll may have in part helped in such mounting arrangements, the present invention provides a more secure and more easily released and re-locked structure for mounting, such D-scrolled wire harness, with improved access to the harness for repair, adjustment or replacement.

The bi-planar nature of inventive clip 10, with the upper mounting surface or side 20a of mounting arm 20 and the spaced plane of cover 14, can be designed to fit almost any stepped or recessed panel-mounting application merely by adjusting the spacing of cover 14 (in its closed position) from mounting arm 20 and the relative angle of the surfaces of cover 14 and mounting arm 20. It will be noticed in the illustrated embodiment that the outer surface of cover 14 is not exactly parallel to surface 20a of mounting arm 20, but is inclined at a slight angle toward Christmas tree clip 22. The angle of cover 14 will vary somewhat, depending on how closely the particular wire harness 30 mates with trough 12 and how far cover 14 can accordingly be depressed into its locking position; the angle of any recessed surface such as 40c which clip 10 is designed to accommodate; and other known factors.

It may be desirable in some applications to form clip 10 and especially mounting arm 20 so as to be significantly bendable or resilient, for example in the case where it is desired to bend the trough end 20a away from a recessed surface such as 40c to release cover 14 from the trough body 12.

Referring to FIG. 2 and FIG. 3, it will be apparent to those skilled in the art that the curved lock arm 16 and resilient guide 17 allow clip 10 to perform a self-guiding and self-locking function which is useful for recessed panel arrangements where the depth or spacing of recessed surface 40c from mounting surface 40a approximates the depth of trough 12 and the spacing of cover 14 from mounting arm 20. By way of example, wire harness 30 can first be taped to clip 10 using tape positioning tabs 18, with cover 14 disengaged from the trough. With the wire harness pre-mounted by tape in this fashion, clip 10 can simply be clipped into mounting surface 40a by inserting Christmas tree clip 22 through a hole 41 in the panel; while the clip 22 is being inserted, the open, disengaged cover 14 is progressively forced into locking engagement with trough 12 by panel surface 40c to the closed, locked position shown in FIG. 3. This is particularly useful for "blind" assembly operations where the installer cannot clearly see or rain free access to finger-operable extension 14b and the locking structure of cover 14.

Another advantage of the present invention as illustrated in FIG. 3 is the spacing between stepped surface 40b and the trough, occupied by finger extension 14b, which allows an installer access to the trough locking structure with a finger or tool to disengage cover 14 from trough 12. In this case a mounting arm 20 with significant bending ability is useful in order to fully disengage trough 12 and lock arm 16. For this purpose it is useful to form mounting arm 20 with a relatively thin cross section, in some cases adding a central rib 21 on lower side 20b of mounting arm 20 to strengthen it without significantly interfering with its ability to bend for opening and closing operations.

While a preferred example of the invention for a specific application has been illustrated above, it will be understood by those skilled in the art that the inventive wire harness clip is subject to various modifications to adapt it to differences in wire harness size, differences in panel-mounting locations, and different mounting and locking requirements. For example, while a toothed, ratchet-type lock arm 16 is illustrated, it is possible to use other types of locking structure between lock arm 16 and trough 12. As noted above, the relative spacing and angle of cover 14 and mounting arm 20 will vary depending on the thickness of the wire harness and the panel surfaces which must be accommodated. While the inventive clip 10 is preferably formed from a single piece of plastic material, multi-piece and composite material arrangements can be used without departing from the scope of the invention. While cover 14 is shown with a preferably flat outer surface, the geometry of its outer surface may vary depending on the nature of any adjacent panel surface 40c which it is designed to accommodate. These and other possible modifications and known equivalents will be apparent to those skilled in the art.

What is claimed is:

1. A wire harness clip adapted to secure a generally D-shaped wire harness to a panel, comprising:

an elongate, substantially planar mounting arm having a first end, a second end, an upper side, and a lower side, a D-shaped trough at the first end of the mounting arm, and an insertion-type panel-engaging mounting means spaced from and located at the second end of the mounting arm, the trough and mounting means both being located on and extending upwardly from the upper side of the mounting arm;

the trough comprising a substantially semi-circular open faced body and a hinged, flat cover moveable between an open position in which the trough body is open, and a closed position in which the cover closes the trough body and defines a substantially planar surface spaced from and generally parallel to the mounting arm.

2. The wire harness clip of claim 1, wherein the cover is hinged to an outer edge of the trough body and has a free end adapted to be releasably locked to an inner end of the trough body in the direction of the mounting means.

3. The wire harness clip of claim 2, wherein the cover includes a locking portion adapted to engage a portion of the trough body in a releasable locking fit.

4. The wire harness clip of claim 3, wherein the locking portion of the cover is self-guiding to its locked position.

5. The wire harness clip of claim 3, wherein the locking portion comprises a lock arm adapted to engage an outer surface of the inner end of the trough body in a releasable locking fit.

6. The wire harness clip of claim 5, wherein the lock arm includes ratchet teeth adapted to engage ratchet teeth formed on the outer surface of the inner end of the trough body in a releasable locking fit.

7. The wire harness clip of claim 6, wherein the lock arm is curved to match the curvature of the outer surface of the inner end of the trough body.

8. The wire harness clip of claim 1, wherein the trough is aligned on the end of the mounting arm so as to define a wire harness axis generally perpendicular to the mounting arm.

9. A wire harness clip adapted to secure a generally D-shaped wire harness to a panel, comprising:

a mounting arm having a semi-circular, upwardly-opening trough at one end and a panel-engaging mounting means at an opposite end, the trough and mounting means being located on an upper side of the mounting arm;

a substantially flat hinged cover on the trough adapted to be moved between an open position away from the trough and a closed position on the trough in which the cover closes the trough and defines a substantially planar surface spaced from and generally parallel to the mounting arm;

wherein the trough is aligned on the end of the mounting arm so as to define a wire harness axis generally perpendicular to the mounting arm and wherein the trough further includes at least one tape positioning tab extending from the trough in alignment with the wire harness axis, the tape positioning tab being adapted to engage a portion of a wire harness inserted in the trough and to be taped to the wire harness.

10. A wire harness clip adapted to secure a generally D-shaped wire harness to a panel, comprising:

an elongate, substantially planar mounting arm having a first end, a second end, an upper side, and a lower side, a D-shaped trough at the first end of the mounting arm, and a panel-engaging mounting means spaced from and located at the second end of the mounting arm, the trough and mounting means both being located on the upper side of the mounting arm;

the trough comprising a substantially semi-circular open faced body and a hinged, flat cover moveable between an open position in which the trough body is open, and a closed position in which the cover closes the trough body and defines a substantially planar surface spaced from and generally parallel to the mounting arm, wherein the cover is hinged to an outer edge of the trough body and has a free end adapted to be releasably locked to an inner end of the trough body in the direction of the mounting means;

wherein the cover includes a locking portion adapted to engage a portion of the trough body in a releasable locking fit; and wherein the cover includes an extension extending beyond the locking portion to provide a finger- or tool-operated surface to open the cover.

11. The wire harness clip of claim 10, wherein the cover extension is spaced from the mounting arm to provide a gap or space in which to insert a finger or tool between the extension and the mounting arm.

12. A wire harness clip adapted to secure a generally D-shaped wire harness to a panel, comprising:

an elongate, substantially planar mounting arm having a first end, a second end, an upper side, and a lower side, a D-shaped trough at the first end of the mounting arm, and a panel-engaging mounting means spaced from and located at the second end of the mounting arm, the trough and mounting means both being located on and extending upwardly from the upper side of the mounting arm;

the trough comprising a substantially semi-circular open faced body and a hinged, flat cover moveable between an open position in which the trough body is open, and a closed position in which the cover closes the trough body and defines a substantially planar surface spaced from and generally parallel to the mounting arm, wherein the mounting means comprises a Christmas tree type clip.

13. The wire harness clip of claim 12, wherein the Christmas tree type clip has a height substantially the same as the height of the trough.

14. A wire harness clip adapted to secure a generally D-shaped wire harness to a panel, comprising:

an elongate, substantially planar mounting arm having a first end, a second end, an upper side, and a lower side, a D-shaped trough at the first end of the mounting arm, and a panel-engaging mounting means spaced from and located at the second end of the mounting arm, the trough and mounting means both being located on the upper side of the mounting arm;

the trough comprising a substantially semi-circular open-faced body and a hinged, flat cover movable between an open position in which the trough body is open, and a closed position in which the cover closes the trough body and defines a substantially planar surface spaced from and generally parallel to the mounting arm, the cover being hinged to an outer edge of the trough and having a free end adapted to be releasably locked to an inner end of the trough in the direction of the mounting means, the cover further including a locking portion adapted to engage a portion of the trough in a releasable locking fit, wherein a resilient guide is located on the mounting arm and adapted to resiliently engage and guide the locking portion to its closed position automatically as the cover is moved from the open to the closed position.

15. A wire harness clip adapted to secure a generally D-shaped wire harness to a panel, comprising:

an elongate, substantially planar mounting arm having a first end, a second end, an upper side, and a lower side, a D-shaped trough at the first end of the mounting arm, and a panel-engaging mounting means spaced from and located at the second end of the mounting arm, the trough and mounting means being located on the upper side of the mounting arm;

the trough comprising a substantially semi-circular open-faced body and a hinged, flat cover movable between an open position in which the trough body is open, and a closed position in which the cover closes the trough body and defines a substantially planar surface spaced from and generally parallel to the mounting arm, the cover being hinged to an outer edge of the trough and having a free end adapted to be releasably locked to an inner end of the trough in the direction of the mounting means, the cover further including a locking portion adapted to engage a portion of the trough in a releasable locking fit, the locking portion further comprising a lock arm adapted to engage an outer surface of the inner end of the trough in a releasable locking fit, the lock arm further including ratchet teeth adapted to engage ratchet teeth formed on the outer surface of the inner end of the trough in a releasable locking fit, the lock arm further being curved to match the curvature of the outer surface of the inner end of the trough, wherein a resilient guide is formed on the mounting arm adjacent the outer surface of the inner end of the trough, the guide adapted to engage the curved lock arm as it is moved from the open to the closed position and to hold it in locking contact with the teeth on the trough.

* * * * *

UNITED STATES PATENT AND TRADEMARK OFFICE
CERTIFICATE OF CORRECTION

| | |
|---|---|
| PATENT NO. : 6,206,331 B1 | Page 1 of 1 |
| DATED : March 27, 2001 | |
| INVENTOR(S) : Keith, et al. | |

It is certified that error appears in the above-identified patent and that said Letters Patent is hereby corrected as shown below:

<u>Column 3,</u>
Line 20, delete "wile" and insert -- wire --

<u>Column 4,</u>
Line 15, delete "rain" and insert -- gain --

Signed and Sealed this

Sixteenth Day of October, 2001

*Attest:*

*Attesting Officer*

NICHOLAS P. GODICI
*Acting Director of the United States Patent and Trademark Office*